(12) United States Patent
Osada et al.

(10) Patent No.: US 11,371,673 B2
(45) Date of Patent: Jun. 28, 2022

(54) OUTER LENS FOR LIGHTING FIXTURES FOR VEHICLES, LIGHTING FIXTURE FOR VEHICLES PROVIDED WITH SAID OUTER LENS, AND METHOD FOR PRODUCING SAID LIGHTING FIXTURE FOR VEHICLES

(71) Applicant: Ichikoh Industries, Ltd., Isehara (JP)

(72) Inventors: Shintaro Osada, Isehara (JP); Kenichi Asaka, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 16/967,930

(22) PCT Filed: Feb. 8, 2019

(86) PCT No.: PCT/JP2019/004561
§ 371 (c)(1),
(2) Date: Aug. 6, 2020

(87) PCT Pub. No.: WO2019/156202
PCT Pub. Date: Aug. 15, 2019

(65) Prior Publication Data
US 2021/0033257 A1 Feb. 4, 2021

(30) Foreign Application Priority Data

Feb. 8, 2018 (JP) .............................. JP2018-021449

(51) Int. Cl.
*F21S 43/20* (2018.01)
*B29C 65/16* (2006.01)
(Continued)

(52) U.S. Cl.
CPC .......... *F21S 43/26* (2018.01); *B29C 65/1616* (2013.01); *B29C 65/1635* (2013.01);
(Continued)

(58) Field of Classification Search
CPC .. F21S 43/26; B29C 65/1616; B29C 65/1635; B29C 66/301; B29C 66/71; B29C 66/7332; B29C 66/73365
See application file for complete search history.

(56) References Cited

U.S. PATENT DOCUMENTS

| 10,180,223 B2* | 1/2019 | Grammer ................ F21S 41/29 |
| 2004/0217856 A1* | 11/2004 | Egashira ............... F21S 43/255 340/468 |

(Continued)

FOREIGN PATENT DOCUMENTS

| JP | 2007-299759 A | 11/2007 |
| JP | 2011-255628 A | 12/2011 |
| JP | 2018-10805 A | 1/2018 |

OTHER PUBLICATIONS

International Search Report dated Apr. 23, 2019 in PCT/JP2019/004561 filed Feb. 8, 2019, citing documents AA-AB and AO-AQ therein, 2 pages.

(Continued)

*Primary Examiner* — Bryon T Gyllstrom
*Assistant Examiner* — Christopher E Dunay
(74) *Attorney, Agent, or Firm* — Oblon, McClelland, Maier & Neustadt, L.L.P.

(57) ABSTRACT

An outer lens for a lighting fixture for a vehicle includes a first region formed of a first material and a second region formed of a second material adjacent to the first region. The first material transmits light in a visible light range. The second material has a first wavelength range with transmittance equal to or less than a first transmittance. A second wavelength range has a transmittance equal to or more than a second light transmittance. A third wavelength range is between the first wavelength range and the second wavelength range. The first wavelength range includes a visible light at an S wavelength or a shorter wavelength. The second (Continued)

wavelength range includes a wavelength range from an M wavelength to an L wavelength. The third wavelength range increases from the S wavelength to the M wavelength. The first wavelength range includes the emission wavelength.

11 Claims, 5 Drawing Sheets

(51) Int. Cl.
*B29C 65/00* (2006.01)
*B29L 31/30* (2006.01)
*B29L 31/00* (2006.01)

(52) U.S. Cl.
CPC ............ *B29C 66/301* (2013.01); *B29C 66/71* (2013.01); *B29C 66/7332* (2013.01); *B29C 66/73365* (2013.01); *B29C 66/73921* (2013.01); *B29L 2031/30* (2013.01); *B29L 2031/747* (2013.01)

(56) References Cited

U.S. PATENT DOCUMENTS

| | | |
|---|---|---|
| 2005/0117362 A1* | 6/2005 | Yamada ................. F21S 41/321 362/509 |
| 2007/0258153 A1 | 11/2007 | Martynov et al. |
| 2008/0212320 A1 | 9/2008 | Martynov et al. |
| 2012/0155106 A1 | 6/2012 | Kosugi et al. |
| 2017/0321864 A1* | 11/2017 | Dellock .................. F21S 43/26 |
| 2018/0231206 A1* | 8/2018 | Hara ..................... G01S 17/931 |
| 2019/0351623 A1* | 11/2019 | Kihara .................... B32B 27/22 |
| 2019/0383462 A1* | 12/2019 | Schoen ................ G01N 21/958 |
| 2020/0124246 A1* | 4/2020 | Field ..................... B60Q 3/217 |
| 2020/0217477 A1* | 7/2020 | Nicholson ............. F21S 43/245 |

OTHER PUBLICATIONS

The extended European search report dated Oct. 21, 2021 in corresponding European Patent Application No. 19751194.2 (9 pages).

Notice of First Examination Opinion dated Dec. 24, 2021 in corresponding Chinese Patent Application No. 201980011725.1 (with English translation)(20 pages).

* cited by examiner

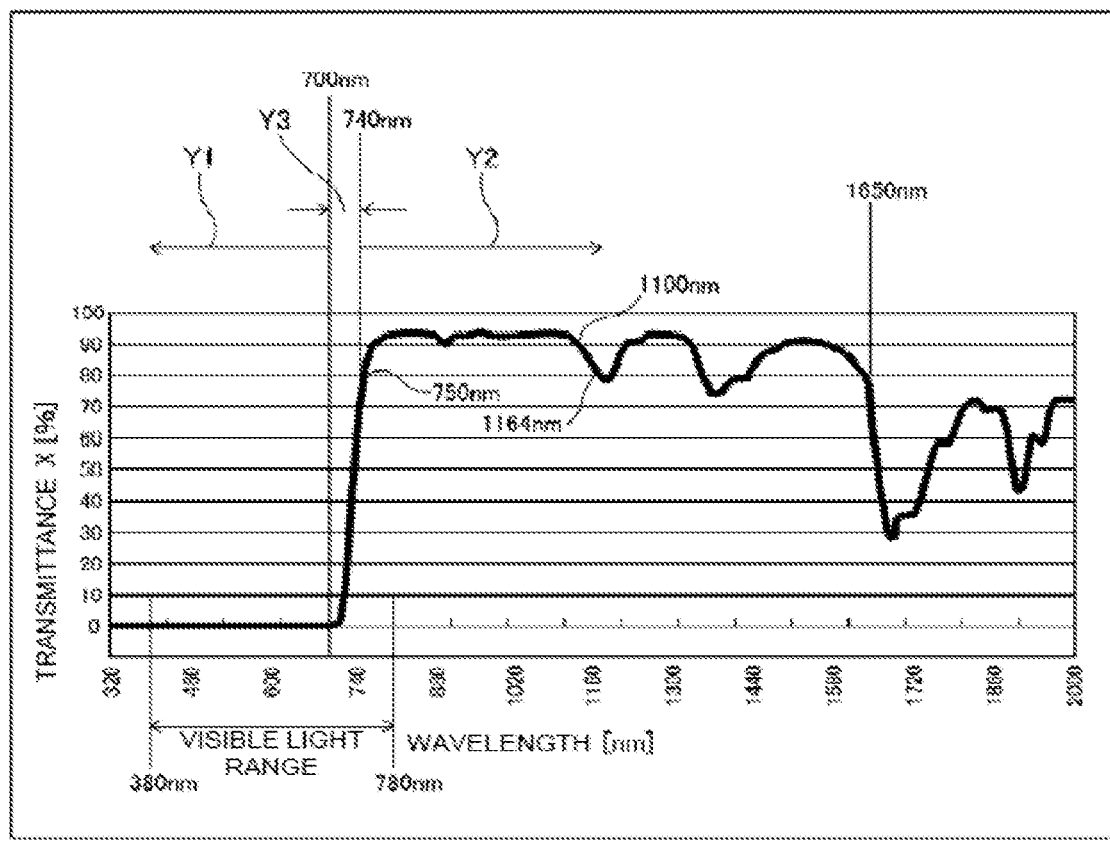

OUTER LENS FOR LIGHTING FIXTURES FOR VEHICLES, LIGHTING FIXTURE FOR VEHICLES PROVIDED WITH SAID OUTER LENS, AND METHOD FOR PRODUCING SAID LIGHTING FIXTURE FOR VEHICLES

TECHNICAL FIELD

The disclosure relates to an outer lens for a lighting fixture of a vehicle, a lighting fixture for a vehicle including the outer lens, and a method for producing the lighting fixture for a vehicle.

BACKGROUND ART

Conventionally, in the case where a contact portion between a front surface cover and a lamp body of a lighting fixture of a vehicle is laser welded, there has been known a mode in which a visible-light blocking layer that transmits laser light and absorbs visible light is disposed in the laser-welded portion between the full surface cover and the lamp body, so as to prevent cloudiness due to bubbles appearing in the laser-welded portion from being visible through the laser-welded portion (see PTL 1).

CITATION LIST

Patent Literature

PTL 1: Japanese Unexamined Patent Publication No. 2011-255628

SUMMARY OF THE INVENTION

Problems to be Solved by the Invention

The full surface cover (hereinafter also referred to as an outer lens) is a member that covers an opening in the front side of the lamp body (hereinafter also referred to as a housing) in which a light source is disposed, to seal the opening. The full surface cover is made of a material that transmits visible light so that light from the light source can basically be emitted forward.

In some cases, the outer lens is colored in red or orange depending on the type of the lamp, such as stop lamp, turn lamp, etc. Since it is necessary to transmit visible light from such a lamp, even the colored portions are at least translucent. Therefore, even if there are some scratches on the surface, the scratches are less likely to stand out.

In the case where a region (hereinafter also referred to as a dressed region) other than the region that emits light and serves as a lamp is provided as a design of the outer lens, the dressed region must be clearly distinguished from the lamp region that emits light and serves as a lamp (hereinafter also referred to as a light emitting region).

If the dressed region is made of a material that does not transmit visible light, the light from the light emitting region does not pass through the dressed region. Therefore, the dressed region can be clearly distinguished from the light emitting region.

However, in such a case, there is a problem in that a scratch on the surface is easily noticeable due to light reflected at the scratch.

Therefore, an object of the disclosure is to provide an outer lens of a lighting fixture for a vehicle in which a scratch is not easily noticeable even in a dressed region, a lighting fixture for a vehicle including the outer lens, and a method for producing the lighting fixture for a vehicle.

Means for Solving the Problem

According to an aspect of the disclosure, an outer lens that is used for a lighting fixture for a vehicle includes a first region formed of a first material and a second region formed of a material that is colored, the second region being adjacent to the first region and including a region other than a region in contact with a housing. The first material is a material transmitting light from a first light source of a semiconductor type having an emission wavelength in a visible light range. The second material includes a first wavelength range in which a light transmittance is equal to or less than a first transmittance; a second wavelength range on a longer wavelength side of the first wavelength range, with the light transmittance being equal to or more than a second transmittance in the second wavelength range; and a third wavelength range between the first wavelength range and the second wavelength range. The first wavelength range is a wavelength range including a visible light at an S wavelength at least established within a visible light range or a shorter wavelength, the second wavelength range includes a wavelength range from an M wavelength at least established within a visible light range on a longer wavelength side of the S wavelength to an L wavelength longer than the M wavelength. The first transmittance is set to a low transmittance that suppresses transmission of light in the first wavelength range. The second transmittance is set to a high transmittance that allows transmission of light in the second wavelength range. The third wavelength range is established to increase transmittance from the S wavelength to the M wavelength. The transmittance is adjusted by a coloring agent contained in the second material. The first wavelength range includes the emission wavelength.

According to this aspect, the first transmittance and the second transmittance are preferably transmittances measured when the second material is formed into a plate having a thickness of 1 mm. The first transmittance is preferably 5% or less and the second transmittance is 70% or more.

In this aspect, the second wavelength range is preferably established to be a range including at least a wavelength of 808 nm, 840 nm, 940 nm, 980 nm, 1064 nm, 1070 nm or 1090 nm, In this aspect, the S wavelength is preferably a wavelength of 680 nm or more but less than 780 nm, and the emission wavelength is preferably within a wavelength range of 550 nm or more but less than 680 nm.

In this aspect, the outer lens preferably is free of a rib structure for blocking light from the first light source in the second region.

In this aspect, the first material and the second material each preferably include a thermoplastic resin as a base material, and the second material is preferably a material containing a dye as a coloring agent in the base material.

According to another aspect, a method of producing a lighting fixture for a vehicle includes preparing a lamp body, including a housing, that opens in a light irradiation direction and accommodates a first light source of a semiconductor type, having an emission wavelength in a visible light range; preparing an outer lens that covers an opening of the housing; and laser welding an area where the outer lens and the housing are in contact with each other, wherein the outer lens is the outer lens according to the above-described aspect, and a laser beam having a wavelength within the second wavelength range is used during the laser welding.

According to another aspect, a lighting fixture for a vehicle includes a lamp body, including a housing, that opens in a light irradiation direction and accommodates a first light source of a semiconductor type, having an emission wavelength in a visible light range as well as an outer lens that covers an opening of the housing. The outer lens includes a first region formed of a first material that transmits light from the first light source of a semiconductor type, having an emission wavelength in a visible light range; and a second region formed of a second material that is colored, the second region being adjacent to the first region and including a region other than a region in contact with the housing. The second material includes a first wavelength range in which a light transmittance is equal to or less than a first transmittance; a second wavelength range on a longer wavelength side of the first wavelength range, with the light transmittance being equal to or more than a second transmittance in the second wavelength range; and a third wavelength range between the first wavelength range and the second wavelength range. The first wavelength range is a wavelength range including a visible light at an S wavelength at least established within a visible light range or a shorter wavelength. The second wavelength range includes a wavelength range from an M wavelength at least established within a visible light range on a longer wavelength side of the S wavelength to an L wavelength longer than the M wavelength. The first transmittance is set to a low transmittance that suppresses transmission of light in the first wavelength range, the second transmittance is set to a high transmittance that allows transmission of light in the second wavelength range. The third wavelength range is established to increase transmittance from the S wavelength to the M wavelength, and the transmittance is adjusted by a coloring agent contained in the second material. The first wavelength range includes the emission wavelength.

In this aspect, the outer lens preferably is free of a rib structure for blocking the light from the first light source from entering the second region, and the lamp body is also preferably free of a rib structure for blocking the light from the first light source from entering the second region.

In this aspect, the first transmittance and the second transmittance are preferably transmittances measured when the second material is formed into a plate having a thickness of 1 mm. The first transmittance is preferably 5% or less, and the second transmittance is preferably 70% or more. The second wavelength range is preferably established to be a range including at least a wavelength of 808 nm, 840 nm, 940 nm, 980 nm, 1064 nm, 1070 nm, or 1090 nm, the S wavelength is preferably a wavelength of 680 nm or more but less than 780 nm, and the emission wavelength is preferably a wavelength range of 550 nm or more but less than 680 nm.

In this aspect, the first material and the second material each preferably include a thermoplastic resin as a base material, and the second material is preferably a material containing a dye as a coloring agent in the base material.

Effect of the Invention

The disclosure provides an outer lens of a lighting fixture for a vehicle in which a scratch is not easily noticeable even in a dressed region, a lighting fixture for a vehicle including the outer lens, and a method for producing the lighting fixture for a vehicle.

BRIEF DESCRIPTION OF THE DRAWINGS

FIG. 6 is a graph showing the results of the transmittances measured of when a formed into a plate having a thickness of 1 mm is used as a second material of the present embodiment.

MODE FOR CARRYING OUT THE INVENTION

Embodiments will now be described with reference to the accompanying drawings.

Note that the same numbers or reference signs denote the same elements throughout the description of the embodiments.

In the embodiments and drawings, the terms "front", "rear", "top", "bottom", "left", and "right" refer to directions as seen from the driver of the vehicle, unless otherwise specified.

Note that the terms "top" and "bottom" also respectively refer to the "top" and the "bottom" in the vertical direction, and the terms "left" and "right" also respectively refer to the "left" and "right" in the horizontal direction.

Figure 1:
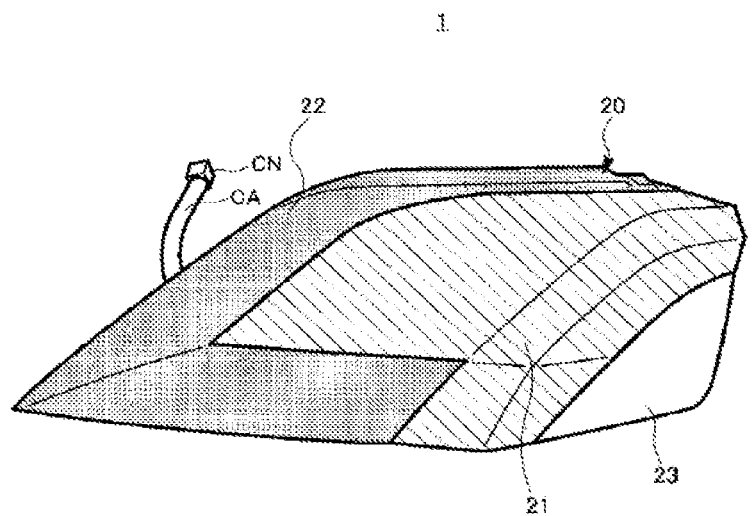
FIG. 1 is a perspective view of a lighting fixture for a vehicle of the present embodiment.

FIG. 1 is a perspective view of a lighting fixture 1 for a vehicle of the present embodiment.

Figure 2:
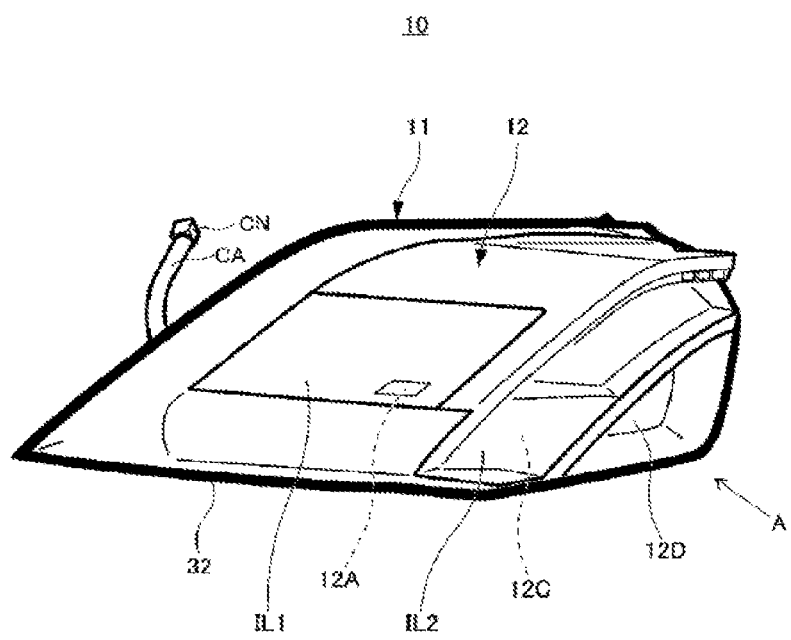
FIG. 2 is a perspective view of a lamp body of the present embodiment.
Figure 3:
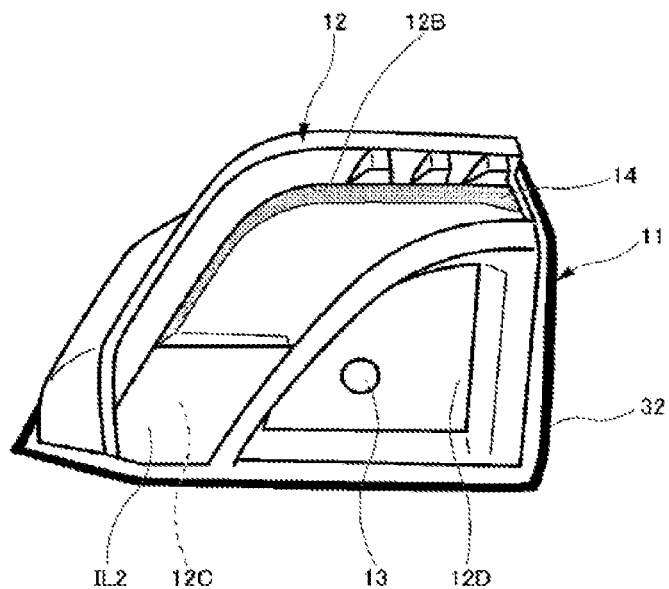
FIG. 3 is a view on arrow A in FIG. 2.

FIG. 2 is a perspective view of a lamp body 10 of the present embodiment. FIG. 3 is a view on arrow A in FIG. 2.

Figure 4:
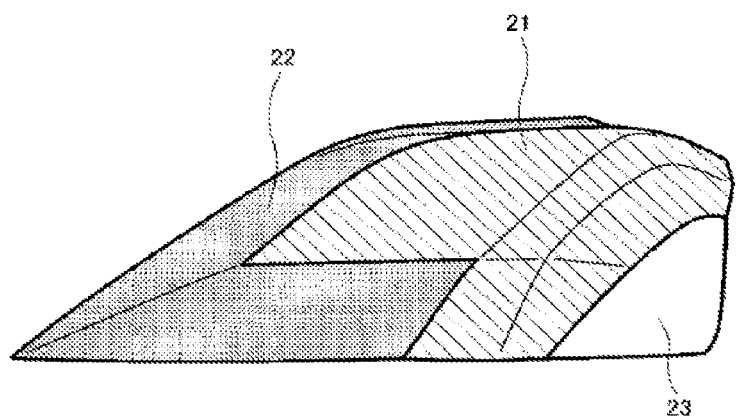
FIG. 4 is a perspective view of the front side of an outer lens of the present embodiment.
Figure 5:
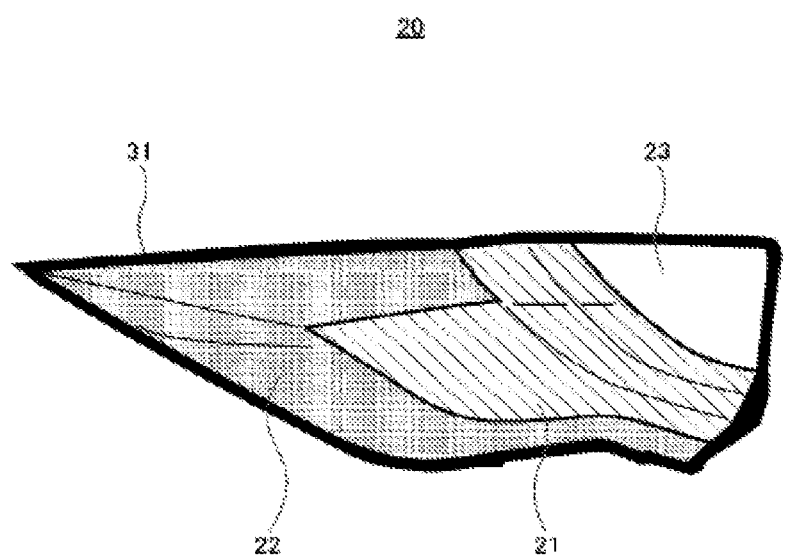
FIG. 5 is a perspective view of the back side of the outer lens of the present embodiment.

FIG. 4 is a perspective view of the front side of an outer lens 20 of the present embodiment. FIG. 5 is a perspective view of the rear side of the outer lens 20 of the present embodiment.

Note that the lighting fixture 1 for a vehicle of the present embodiment is a rear combination lamp provided on each of the left rear side and the right rear side of the vehicle, but it is not limited thereto.

The lighting fixture 1 for a vehicle illustrated in FIG. 1 includes a lamp body 10 illustrated in FIGS. 2 and 3, and an outer lens 20 illustrated in FIGS. 4 and 5.

(Lamp Body 10)

As illustrated in FIGS. 2 and 3, the lamp body 10 includes a housing 11 opening in the light irradiation direction (in this example, the side of the vehicle (left or right side) and the rear side of the vehicle), an inner panel 12 fixed to the housing 11, and a cable CA that is led out from the rear side of the housing 11 and includes a connector CN for supplying electric power.

Note that the inner panel 12 of the present embodiment is entirely painted or vapor-deposited in silver.

As illustrated in FIG. 2, the inner panel 12 has a light irradiation window 12A for a side marker that emits light toward the side (left or right side) of the vehicle. An inner lens IL1 is disposed on the front surface side of a region of the inner panel 12 including the light irradiation window 12A.

Note that the front or back surface of the inner lens IL1 has a grid pattern or embossing, such as grains, and thus, the back side is not readily visible.

The housing 11 accommodates a light source from which light so that light is emitted from the light irradiation window 12A of the inner panel 12.

Note that, in the drawing, the light source for the side marker is hidden behind the inner panel 12.

As illustrated in FIG. 3, the inner panel 12 has an opening 12B in which a light guide member 14 is disposed. The light for the tail lamp is emitted from the light guide member 14 disposed in the opening 12.

The housing 11 accommodates a light source so that light is incident on a light incident end (not illustrated) of the light guide member 14.

Note that, in the drawing, the light source for the tail lamp is also hidden behind the inner panel 12.

As illustrated in FIG. 3, the inner panel 12 has a light irradiation window 12C for a stop lamp that emits light toward the rear of the vehicle. An inner lens IL2 is so disposed to cover the light irradiation window 12C.

The housing 11 accommodates a light source so that light is emitted from the light irradiation window 12C in the inner panel 12.

Note that the front or back surface of the inner lens IL2 has a grid pattern or embossing, such as grains, and thus, the light source for the stop lamp is not visible.

In the present embodiment, the light source for the side marker, the light source for the tail lamp, and the light source for the stop lamp are each a red LED light source of a semiconductor type (having an emission center wavelength of approximately 620 nm) serving as a first light source having an emission wavelength within the range of 550 to 680 nm. Alternatively, each light source may be an LD light source (a laser diode light source) or the like.

Note that the mode of the housing 11 accommodating the first light source is not particularly limited. The first light source is not limited to one fixed to the housing 11. Alternatively, the first light source may be one that is fixed to the inner panel 12, and the inner panel 12 to which the first light source is fixed may be fixed to the housing 11.

As illustrated in FIG. 3, the inner panel 12 has a recess 12D for a turn lamp that emits light toward the rear side of the vehicle. A light emitting section of a light bulb 13 that emits orange light is disposed in the recess 12D.

(Outer Lens 20)

As illustrated in FIG. 1, the outer lens 20 is a member fixed to the housing 11 so as to cover the opening of the housing 11 (see FIGS. 2 and 3) opening in the light irradiation direction (in this example, toward a side of the vehicle (left or right side) and the rear side of the vehicle).

As illustrated in FIG. 4, the outer lens 20 includes a first region 21 corresponding to the side marker, the tail lamp, and the stop lamp that emit light from the first light sources, a second region 22 provided adjacent to the first region 21 that is a dressed region for design and does not emit light, and a third region 23 that is separated from the second region 22 by the first region 21 and corresponds to the turn lamp that emits light from the light bulb 13 (see FIG. 3).

The base material of the first region 21, the second region 22, and the third region 23 are acrylic resin.

The base material of the first region 21 is a first material containing a red dye as a coloring agent. The first region 21 is a translucent region colored red that sufficiently transmits light from the first light source. The base material of the third region 23 contains no dye, and thus the third region 23 is a colorless and transparent region made of the base material or a third material.

The base material of the second region 22 is a second material containing dyes of multiple colors as coloring agents to colored the second material black. The second region 22 is the region colored black. The outer lens 20 of the present embodiment integrates the materials (the first material, the second material, and the third material) through multicolor molding.

A dye used as a coloring agent for coloring such a portion has higher compatibility with the base material than a pigment used as a coloring agent. Therefore, when a dye is used as a coloring agent, the color is enhanced, and the weather resistance of the exterior can be improved with almost no deterioration of the weather resistance of the exterior due to coloring.

Note that, in the present embodiment, an acrylic resin is used as the base resin. However, the base resin is not limited thereto. Alternatively, the base resin may be any resin that is a thermoplastic resin that does not hinder welding as described below, beside acrylic resin.

However, in consideration of weldability, mechanical strength, weather resistance, etc., it is preferable to use acrylic resin as the base resin.

The second material constituting the second region 22 will now be described in more detail.

FIG. 6 is a graph showing the measured results of transmittance X of when a plate material having a thickness of 1 mm is used as the second material.

Note that the transmittance X is calculated as "transmittance X=(transmitted light intensity X2/irradiated light intensity X1)×100[%], where irradiated light intensity X1 is the intensity of the light incident on the plate material for measurement and the transmitted light intensity X2 is the intensity of the light transmitted through the plate material. In FIG. 6, the horizontal axis represents the wavelength [nm] of light, and the vertical axis represents the transmittance X [%] for light of each wavelength.

The transmittance of the second material is adjusted by incorporating multiple dyes that absorb light on the shorter wavelength side of the S wavelength but hardly absorb light on the longer wavelength side of the S wavelength, as described below.

Typically, visible light that can be seen by the human eye is said to be in the wavelength range of 380 nm to 780 nm (hereinafter referred to as the visible light range). As illustrated in FIG. 6, the second material has a first wavelength range Y1 set to a first transmittance or lower. The first wavelength range Y1 is a wavelength range including visible light on the shorter wavelength side of the S wavelength, which is approximately 700 nm and established in the visible light range. The first transmittance is a low transmittance that suppresses the transmission of light in the first wavelength range Y1.

Specifically, the first transmittance is preferably 5% or less, more preferably 3% or less, further preferably 1% or less. In the present embodiment, the first transmittance is approximately 0.2%.

By reducing the first transmittance in this way, it is possible to suppress transmission of light in the first wavelength range Y1 even if the thickness of the outer lens 20 is reduced to reduce the weight and material cost.

As described above, the emission wavelength of the first light source is within the range of 550 to 680 nm. Thus, the first wavelength range Y1 includes the emission wavelength of the first light source, and the second region 22 made of the second material suppresses the transmission of light from the first light source.

Therefore, as illustrated in FIG. 5, even when the outer lens 20 has a simple configuration without a rib structure that can block the light from the first light source from entering the second region 22 at the boundary between the first region 21 and the second region 22, the second region 22 does not emit the light from the first light source.

Note that, as illustrated in FIG. 2, the lamp body 10 may have no rib structure that can block light from the first light source from entering the second region 22 (see FIG. 4).

Since the second region 22 is formed of the second material, as described above, the light from the first region 21 (lamp region) is not emitted through the second region 22 (dressed region), without a complicated structure, such as a rib structure, for blocking light, the second region 22 can be clearly distinguished from the lamp region.

Note that, when light broadly includes all wavelengths in the visible light range, such as that from a bulb, the second region 22 cannot be clearly distinguished from the first region 21 (lamp region) because even when the transmittance of the light on the shorter wavelength side of the S wavelength (approximately 700 nm in this example) is lowered in the visible light range, the light on the longer wavelength side of the S wavelength transmits the second region 22. Therefore, it is preferable that the first light source be a light source of a semiconductor type that has an emission wavelength in a specific range within the visible light range (for example, a specific range in the visible light range of 680 nm or lower).

As illustrated in FIG. 6, the second material has a second wavelength range Y2 and a third wavelength range Y3. The second wavelength range Y2 is disposed on the longer wavelength side of the first wavelength range Y1 and has light transmittance higher than or equal to a second transmittance. The third wavelength range Y3 is disposed between the first wavelength range Y1 and the second wavelength range Y2.

Specifically, the second material includes a high-transmittance second wavelength range Y2 in which the second transmittance is 70% or higher. The second wavelength range Y2 has a wavelength range established on the longer wavelength side of the S wavelength or 700 nm in the visible light range, between an M wavelength or 740 nm and an L wavelength or 1650 nm on the longer wavelength side of the M wavelength.

Furthermore, the second material includes a second wavelength range Y2 in which the second transmittance is 80% or higher. The second wavelength range Y2 has a wavelength range established on the longer wavelength side of the S wavelength or 700 nm in the visible light range, between an M wavelength or 750 nm and an L wavelength or 1164 nm on the longer wavelength side of the M wavelength.

Since the second material has a transmittance of almost 90% or more in the wavelength range of 780 to 1100 nm, the second material includes a second wavelength range Y2 in which the second transmittance is almost 90% or higher. The second wavelength range Y2 has a wavelength range established on the longer wavelength side of the S wavelength or 700 nm in the visible light range, between an M wavelength or 780 nm and an L wavelength or 1100 nm on the longer wavelength side of the M wavelength.

Although the reason will be described below, the second wavelength range Y2 is preferably established as a range including at least one of the wavelengths of 808 nm, 840 nm, 940 nm, 980 nm, 1064 nm, 1070 nm and 1090 nm. When the second transmittance of the second material is 70% or more, 80% or more, or almost 90% or more, the second wavelength range Y2 can be established as a range including at least one wavelength of 808 nm, 840 nm, 940 nm, 980 nm, 1064 nm, 1070 nm, and 1090 nm.

As illustrated in FIG. 6, in the third wavelength range Y3, the transmittance increases from the S wavelength or 700 nm to the M wavelength (for example, the M wavelength is 740 nm when the second transmittance is 70%, 750 nm when the second transmittance is 80%, and 780 nm when the second transmittance is almost 90% or more).

Since the third wavelength range Y3 is on the longer wavelength side of the visible light range, the third wavelength range Y3 can transmit a portion of the visible light on the longer wavelength side.

Therefore, in the second region 22 formed in the second material, not all visible light is reflected at the surface, and a portion of the visible light penetrates inside. The visible light that penetrates inside is reflected toward the surface due to scattering, or the like.

For this reason, even if there is a scratch on the surface, the light reflected at the scratch is visually recognized while the light is mixed with light reflected from the inside of the second region 22. Therefore, the light reflected at the surface of the scratch is less noticeable, and thus, the scratch itself is less noticeable.

Since the visible light in the visible light range on the longer wavelength side penetrates inside the second region 22, the reflection at the surface of the second region 22 is reduced and the white light feeling of the surface is suppressed. As a result, the second region 22 appears to be a deep black color and can achieve an imposing design.

When the emission wavelength of the first light source is within the range of 550 to 680 nm as in the present embodiment, it is preferable that the above-mentioned S wavelength be 680 nm or more to prevent transmission of light to the second region 22 from the first light source.

As described above, to transmit a portion of the light on the longer wavelength side of the visible light range and make a scratch on the surface of the second region 22 less noticeable, it is preferred that the S wavelength be less than 780 nm, and the third wavelength range Y3, which is a wavelength range between the S wavelength and the M wavelength, be a wavelength range including a wavelength range in the visible light range of 40 nm or more.

Note that the third wavelength range Y3 is more preferably includes the wavelength range in the visible light range of 60 nm or more, further preferably the wavelength range in the visible light range of 80 nm or more.

Carbon black is often used for black coloring. Carbon black does not transmit the wavelength, such as 808 nm, 840 nm, 940 nm, 980 nm, 1064 nm, 1070 nm, or 1090 nm, of the laser welder used in such coloring. Therefore, when the second region 22 is to be colored with carbon black or the like, and the contact region between the second region 22 and the housing 11 is to be laser-welded, the surface of the second region 22 melts first, and the contact region cannot be welded together. For this reason, another welding method should be used.

Figure 7A:
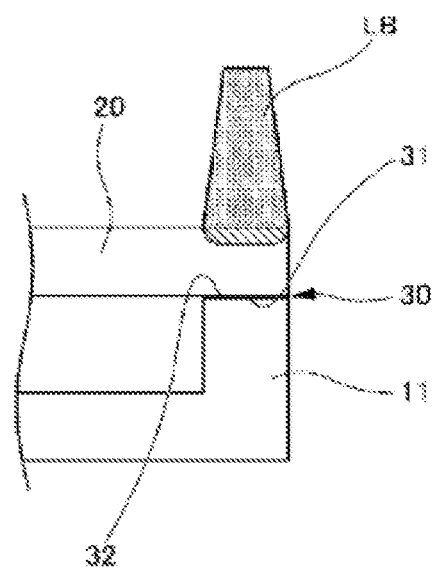
FIGS. 7A and 7B are diagrams for describing laser welding of an outer lens and a housing of the present embodiment.

More specifically, with reference to FIG. 7, which is a diagram for describing laser welding of the outer lens 20 and the housing 11, a contact region 31 of the outer lens 20 illustrated in FIG. 5 and a contact region 32 of the housing 11 illustrated in FIGS. 2 and 3 disposed in contact with each other are irradiated with a laser beam LB for welding from the outer lens 20 side. In the case where carbon black is used for coloring, the laser beam LB does not reach a contact surface 30, as illustrated in FIG. 7A, and the surface of the outer lens 20 melts.

Figure 7B:
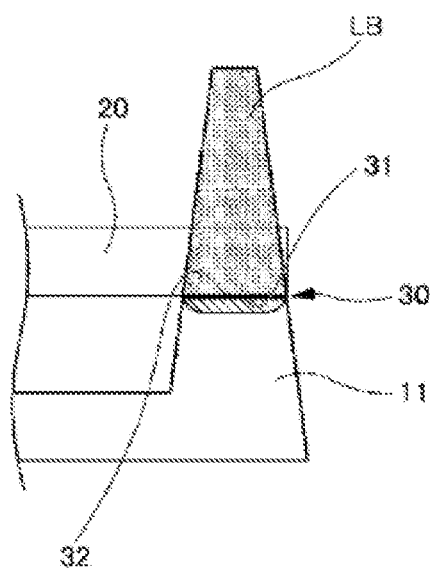

In the present embodiment, the second region 22, including the region in contact with the housing 11 and other regions, formed of the second material is transparent to the wavelength used in the laser welders, and thus, the laser beam LB is hardly absorbed by the second material, and the contact surface 30 with the housing 11 can be irradiated with the laser beam LB, as illustrated in FIG. 7B. Therefore, the surface of the housing 11 can be heated to achieve satisfactory welding.

The first region 21 and the third region 23 have substantially the same transmittance as the second region 22 for the laser beam LB used by the laser welder. Therefore, it is possible to weld the portions of the first region 21, the second region 22, and the third region 23 that come into contact with the housing 11 without changing the conditions of laser intensity during laser welding.

Although specific embodiments have been described above, the present invention is not limited to the above embodiments.

For example, a case in which the emission wavelength of the first light source is within the range of 550 to 680 nm has been described in the above embodiment. Alternatively, the light source may have an emission wavelength on the shorter wavelength side.

Even in such a case, the S wavelength should be set to a wavelength in the visible light range on the longer wavelength side of the emission wavelength.

As described above, the present invention is not limited to the specific embodiments, and modifications and improvements made without departing from the technical idea are also included in the technical scope of the invention. This will be apparent to those skilled in the art from the description of the claims.

EXPLANATION OF SYMBOLS 1 lighting fixture for a vehicle
10 lamp body
11 housing
12 inner panel
12A light irradiation window
12B light irradiation portion
12C light irradiation window
12D recess
13 light bulb
14 light guide member
20 outer lens
21 first region
22 second region
23 third region
30 contact surface
31 contact region
32 contact region
CA cable
CN connector
LB laser beam
IL1, IL2 Inner lens

The invention claimed is:

1. An outer lens configured to be laser welded that is used for a lighting fixture for a vehicle, the outer lens comprising:
a first region formed of a first material that is a material transmitting light from a first light source of a semiconductor type having an emission wavelength in a visible light range; and
a second region formed of a second material that is colored, the second region being adjacent to the first region and including a region that is not in contact with a housing of the lighting fixture,
wherein the second material has, in a first wavelength range, a light transmittance equal to or less than a first transmittance, the first transmittance being set to a low transmittance that suppresses transmission of light in the first wavelength range, the first wavelength range being a wavelength range including a visible light at an S wavelength at least established within a visible light range or a shorter wavelength, and the first wavelength range includes the emission wavelength,
wherein the second material has, in a second wavelength range, a light transmittance equal to or more than a second transmittance, the second transmittance being set to a high transmittance that allows transmission of light in the second wavelength range, the second wavelength range being on a longer wavelength side of the first wavelength range, the second wavelength range including a wavelength range from an M wavelength at least established within a visible light range on a longer wavelength side of the S wavelength to an L wavelength longer than the M wavelength,
wherein the second material has, in a third wavelength range, a light transmittance that increases from the S wavelength to the M wavelength, the third wavelength range being a wavelength range between the first wavelength range and the second wavelength range, and
wherein the second material includes a coloring agent to set the light transmittance of the second material.

2. The outer lens according to claim 1, wherein
the first transmittance and the second transmittance are transmittances measured when the second material is formed into a plate having a thickness of 1 mm, and
the first transmittance is 5% or less and the second transmittance is 70% or more.

3. The outer lens according to claim 1, wherein the second wavelength range is established to be a range including at least a wavelength of 808 nm, 840 nm, 940 nm, 980 nm, 1064 nm, 1070 nm or 1090 nm.

4. The outer lens according to claim 1, wherein
the S wavelength is a wavelength of 680 nm or more but less than 780 nm, and
the emission wavelength is a wavelength of 550 nm or more but less than 680 nm.

5. The outer lens according to claim 1, wherein the outer lens is free of a rib structure for blocking light from the first light source in the second region.

6. The outer lens according to claim 1, wherein
the first material and the second material each include a thermoplastic resin as a base material, and
the second material is a material containing a dye as the coloring agent in the base material.

7. A method of producing a lighting fixture for a vehicle, comprising:
preparing a lamp body including a housing that opens in a light irradiation direction and accommodates a first light source of a semiconductor type having an emission wavelength in a visible light range;
preparing an outer lens that covers an opening of the housing; and
laser welding an area where the outer lens and the housing are in contact with each other, wherein
the outer lens is the outer lens according to claim 1, and
a laser beam having a wavelength within the second wavelength range is used during the laser welding.

8. A lighting fixture for a vehicle, comprising:
a lamp body including a housing that opens in a light irradiation direction and accommodates a first light source of a semiconductor type having an emission wavelength in a visible light range; and an outer lens, wherein the outer lens covers an opening of and is configured to be laser welded to the housing, the outer lens including:

a first region formed of a first material that transmits light from the first light source of a semiconductor type having an emission wavelength in a visible light range; and a second region formed of a second material that is colored, the second region being adjacent to the first region and including a region other that is not in contact with the housing, wherein the second material has, in a first wavelength range, a light transmittance of equal to or less than a first transmittance, the first transmittance being set to a low transmittance that suppresses transmission of light in the first wavelength range, the first wavelength range being a wavelength range including a visible light at an S wavelength at least established within a visible light range or a shorter wavelength, and the first wavelength range includes the emission wavelength, wherein the second material has, in a second wavelength range, a light transmittance equal to or more than a second transmittance, the second transmittance being set to a high transmittance that allows transmission of light in the second wavelength range, the second wavelength range being on a longer wavelength side of the first wavelength range, the second wavelength range including a wavelength range from an M wavelength at least established within a visible light range on a longer wavelength side of the S wavelength to an L wavelength longer than the M wavelength, wherein the second material has, in a third wavelength range, a light transmittance that increases from the S wavelength to the M wavelength, the third wavelength range being a wavelength range between the first wavelength range and the second wavelength range, and wherein the second material includes a coloring agent to set the light transmittance of the second material.

9. The lighting fixture for a vehicle according to claim 8, wherein the outer lens is free of a rib structure for blocking the light from the first light source from entering the second region, and the lamp body is also free of a rib structure for blocking the light from the first light source from entering the second region.

10. The lighting fixture for a vehicle according to claim 8, wherein the first transmittance and the second transmittance are transmittances measured when the second material is formed into a plate having a thickness of 1 mm, the first transmittance is 5% or less, and the second transmittance is 70% or more, the second wavelength range is established to be a range including at least a wavelength of 808 nm, 840 nm, 940 nm, 980 nm, 1064 nm, 1070 nm or 1090 nm, the S wavelength is a wavelength of 680 nm or more but less than 780 nm, and the emission wavelength is a wavelength of 550 nm or more but less than 680 nm.

11. The lighting fixture for a vehicle according to claim 8, wherein the first material and the second material each include a thermoplastic resin as a base material, and the second material is a material containing a dye as a coloring agent in the base material.

* * * * *